Figure 1:
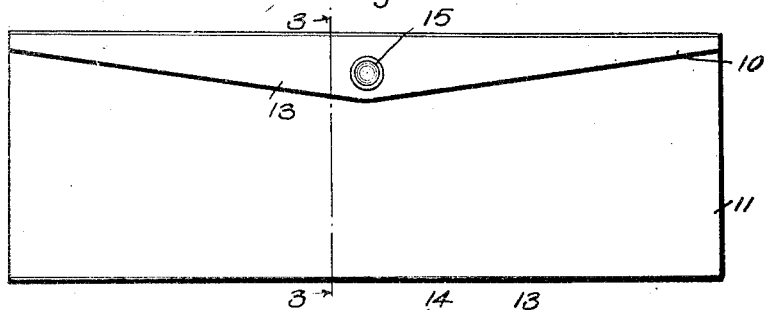

Jan. 31, 1928.

J. E. DALE 1,657,458

DENTAL SET

Filed Nov. 9, 1925

Josephine E. Dale, Inventor

Witnesses
O. E. Churchman Jr.
E. A. Bloch

By Richard B. Owen
Attorney

Patented Jan. 31, 1928.

1,657,458

UNITED STATES PATENT OFFICE.

JOSEPHINE E. DALE, OF GREENFIELD, MISSOURI.

DENTAL SET.

Application filed November 9, 1925. Serial No. 67,969.

This invention relates to dental apparatus and has particular reference to a dental set or compact adapted for cleaning dental structures.

An important object of the invention is to provide a dental cleaning set particularly designed for cleaning false teeth.

A further object of the invention is the provision of a dental set designed to include a plurality of cleaning implements intended particularly for cleaning and scraping false teeth and plates.

A still further object of the invention is the provision of a compact casing arranged to conveniently carry a plurality of cleaning elements and designed to be easily carried while traveling.

Still another object of the invention is the provision of a compact dental set carrying specially designed cleaning implements, the entire structure being arranged so as to be efficient for the purpose intended and salable at a reasonable cost.

Other objects and advantages of the invention will become apparent as the description progresses.

Figure 2:
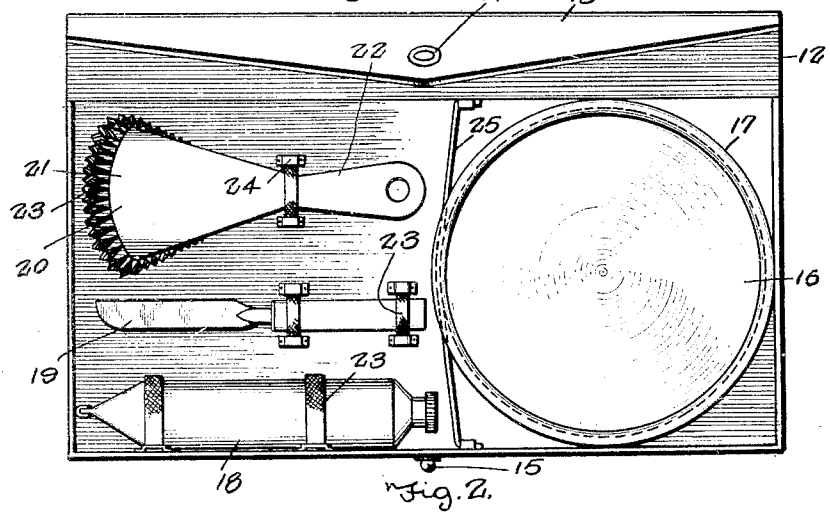
Figure 3:
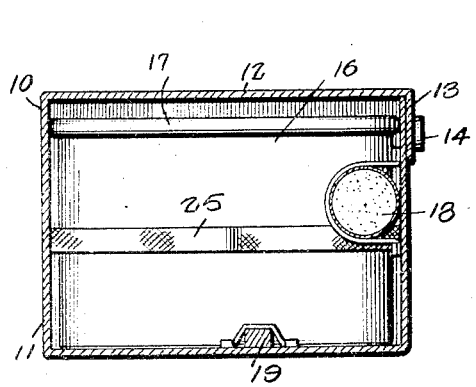
Figure 4:
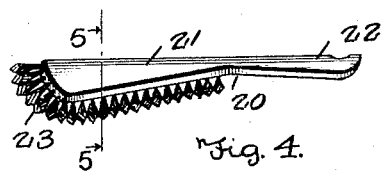
Figure 5:
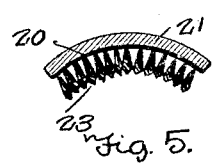

In the accompanying drawing forming a part of this specification and in which like reference characters are employed to designate corresponding parts throughout the same:

Figure 1 is a side elevation of an apparatus constructed in accordance with my invention in closed position, Figure 2 is a top plan view of the same shown in open position, Figure 3 is a transverse sectional view taken on the line 3—3 of Figure 1, Figure 4 is a side elevational view of a brush member embodied in my invention, and Figure 5 is a transverse sectional view taken on the line 5—5 of Figure 4.

In the drawing, wherein for the purpose of illustration is shown the preferred embodiment of my invention, the numeral 10 generally indicates the casing structure of my apparatus, this case being preferably of rectangular formation and including a box like body 11 provided with a swinging cover 12 formed integral with the body or hingedly secured thereon. The free edge of the cover is provided with a tapered flap 13 in the center of which is mounted a snap fastening element 14 engageable with a complementary element 15 secured adjacent the upper edge of the body. This case may be constructed of any suitable material such as paper composition, leather or like material so as to be of inexpensive yet durable structure.

Formed so as to be readily positioned in one end of the case 10 is a cup shaped receptacle 16 preferably of circuar formation and provided at its upper edge with a reinforcing bead 17. This receptacle may be constructed of rubber composition, glass or similar material preferably unbreakable and designed so as to be water-proof. This receptacle occupies practically one-half of the case, while the other half is intended to carry several implements designed to facilitate the cleaning of false teeth.

With this in mind, a tube of tooth paste or other cleaning medium is fastened on the forward side of the container as at 18. The container further carries a simple type of knife 19 secured to the bottom of the case and a suitable cleaning brush 20.

This brush is of special construction arranged so as to efficiently clean the teeth and plate and to retain these members in sanitary condition at all times. With reference to Figures 2, 4 and 5, it is evident that the brush 20 is composed of a tapered substantially triangular shaped body portion 21, having at its reduced extremity a handle member 22 formed integral wth the body or secured thereon. The body 21 is curved so as to assume an arcuate transverse contour and carries on its concave side suitable bristles 23. It is obvious, from the foregoing construction, that a brush of concave formation is provided arranged so that the bristles will assume the general curvature of the teeth on a dental plate. The receptacle 16 and cleaning elements are securely held in position in the case by strips 23 preferably formed of elastic material fastened to the case by clips 24. These strips are arranged to extend about the elements and retain same closely against the case structure while the receptacle is retained in position by a comparatively long strip 25 extending transversely of the case and fastened so as to prevent displacement thereof.

In use, the receptacle 16 is adapted to be filled or partially filled with water or other suitable liquid and the dental plate immersed therein. The teeth of the dental plate are then cleaned by means of the brush 20 and cleaning material contained in the tube 18, the knife 19 being employed for removing the comparatively hard formations of tartar and other matter which collect upon the dental plate.

It is apparent, from the foregoing, that the present invention provides a conveniently transportable compact designed to carry a plurality of articles for cleaning dental plates and the like. The structure embodies a suitable receptacle in which the dental work may be thoroughly washed. The teeth may be scrubbed with a specially constructed brush and the tooth paste applied thereon. The harder formation may be removed from the teeth and plate by the knife 19 constructed so as to be particularly adaptable for this purpose.

It is to be understood that the form of my invention herewith shown and described is to be taken as the preferred example of the same and is readily susceptible of modification, so that various changes as to the shape, size and arrangement of parts may be resorted to without departing from the spirit of the invention or the scope of the subjoined claim.

Having thus described my invention, I claim:

A dental set comprising a rectangular casing, a cover therefor, a yieldable strip extending across the casing and secured to opposite walls thereof, individual strips secured in group formation to the bottom of the casing, toilet articles removably mounted in the individual strips, and a cup of a size to have abutting relation with the walls of the casing and a yieldable engagement with said yieldable strip.

In testimony whereof I affix my signature.

JOSEPHINE E. DALE.